United States Patent
Yang et al.

(10) Patent No.: US 12,228,941 B2
(45) Date of Patent: Feb. 18, 2025

(54) ACTIVE SCENE MAPPING METHOD BASED ON CONSTRAINT GUIDANCE AND SPACE OPTIMIZATION STRATEGIES

(71) Applicant: DALIAN UNIVERSITY OF TECHNOLOGY, Dalian (CN)

(72) Inventors: Xin Yang, Dalian (CN); Xuefeng Yin, Dalian (CN); Baocai Yin, Wuxi (CN); Xiaopeng Wei, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 21 days.

(21) Appl. No.: 18/464,917

(22) Filed: Sep. 11, 2023

(65) Prior Publication Data
US 2024/0295879 A1    Sep. 5, 2024

(51) Int. Cl.
*G05D 1/02*    (2020.01)
*G05D 1/00*    (2006.01)

(52) U.S. Cl.
CPC ......... *G05D 1/0274* (2013.01); *G05D 1/0088* (2013.01); *G05D 1/0217* (2013.01)

(58) Field of Classification Search
CPC .. G05D 1/0274; G05D 1/0088; G05D 1/0217; G05D 2101/15; G05D 1/644; G06N 3/045
See application file for complete search history.

*Primary Examiner* — Aryan E Weisenfeld
*Assistant Examiner* — Godfrey Aleksander Maciorowski
(74) *Attorney, Agent, or Firm* — Muncy, Geissler, Olds & Lowe, P.C.

(57) ABSTRACT

The present invention proposes an active scene mapping method based on constraint guidance and space optimization strategies, comprising a global planning stage and a local planning stage; in the global planning stage, the next exploration goal of a robot is calculated to guide the robot to explore a scene; and after the next exploration goal is determined, specific actions are generated according to the next exploration goal, the position of the robot and the constructed occupancy map in the local planning stage to drive the robot to go to a next exploration goal, and observation data is collected to update the information of the occupancy map. The present invention can effectively avoid long-distance round trips in the exploration process so that the robot can take account of information gain and movement loss in the exploration process, find a balance of exploration efficiency, and realize the improvement of active mapping efficiency.

1 Claim, 5 Drawing Sheets

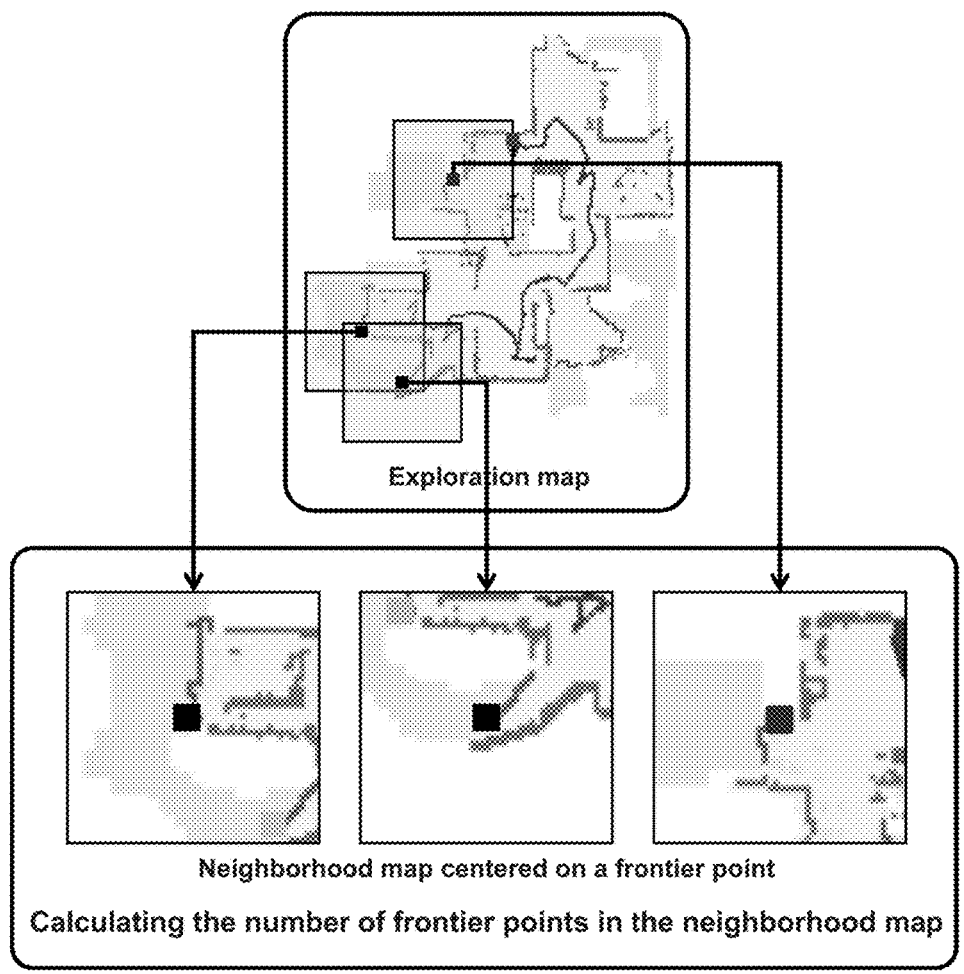
Fig. 3
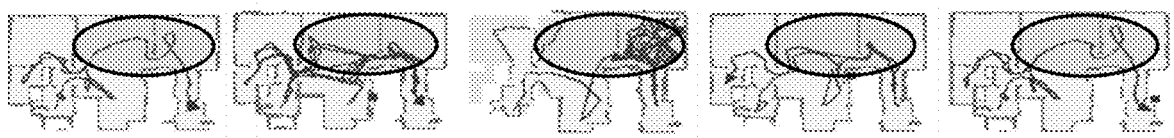
Fig. 4(a-1)  Fig. 4(a-2)  Fig. 4(a-3)  Fig. 4(a-4)  Fig. 4(a-5)
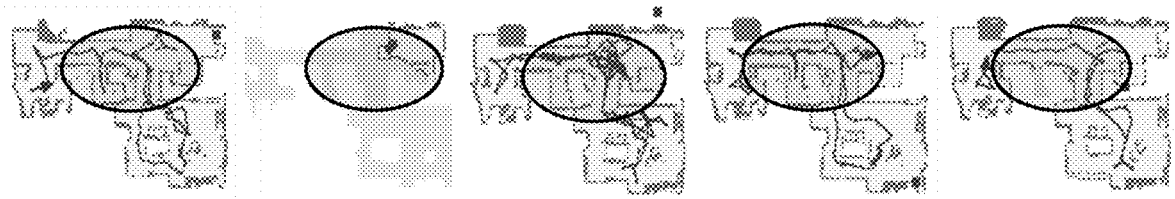
Fig. 4(b-1)  Fig. 4(b-2)  Fig. 4(b-3)  Fig. 4(b-4)  Fig. 4(b-5)
Fig. 4(c-1)  Fig. 4(c-2)  Fig. 4(c-3)  Fig. 4(c-4)  Fig. 4(c-5)

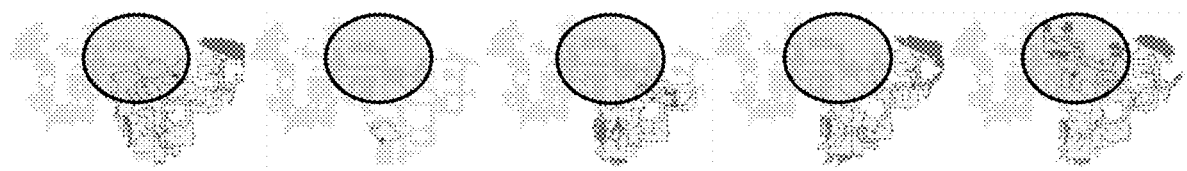
Fig. 4(d-1)   Fig. 4(d-2)   Fig. 4(d-3)   Fig. 4(d-4)   Fig. 4(d-5)
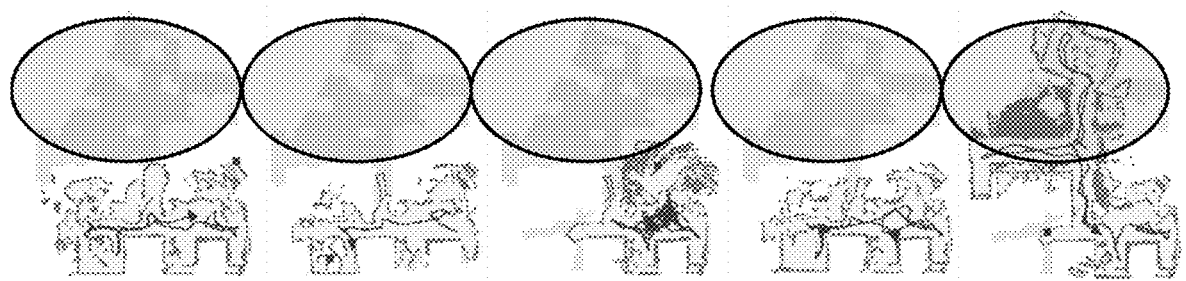
Fig. 4(e-1)   Fig. 4(e-2)   Fig. 4(e-3)   Fig. 4(e-4)   Fig. 4(e-5)
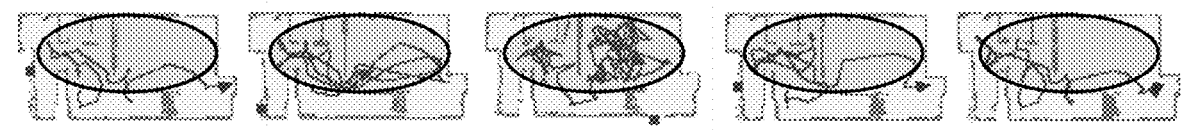
Fig. 5(a-1)   Fig. 5(a-2)   Fig. 5(a-3)   Fig. 5(a-4)   Fig. 5(a-5)
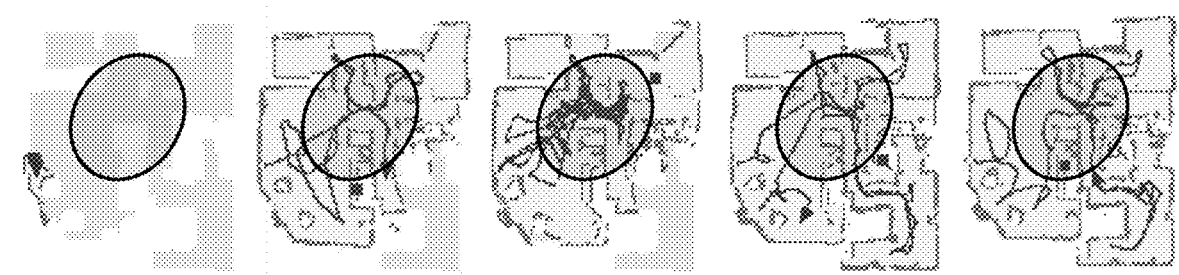
Fig. 5(b-1)   Fig. 5(b-2)   Fig. 5(b-3)   Fig. 5(b-4)   Fig. 5(b-5)
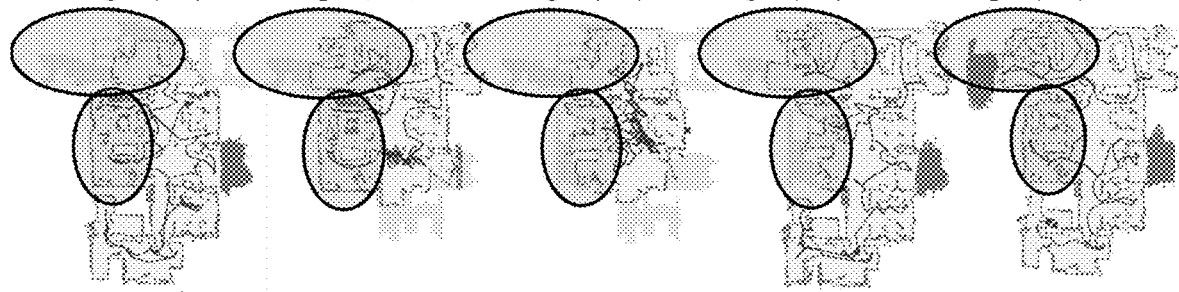
Fig. 5(c-1)   Fig. 5(c-2)   Fig. 5(c-3)   Fig. 5(c-4)   Fig. 5(c-5)
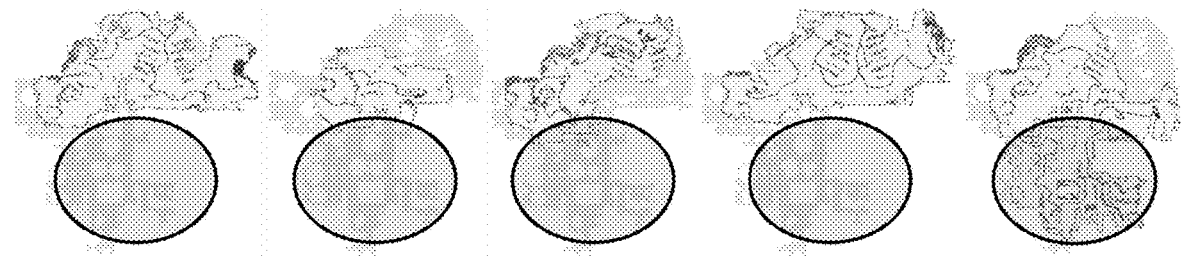
Fig. 5(d-1)   Fig. 5(d-2)   Fig. 5(d-3)   Fig. 5(d-4)   Fig. 5(d-5)

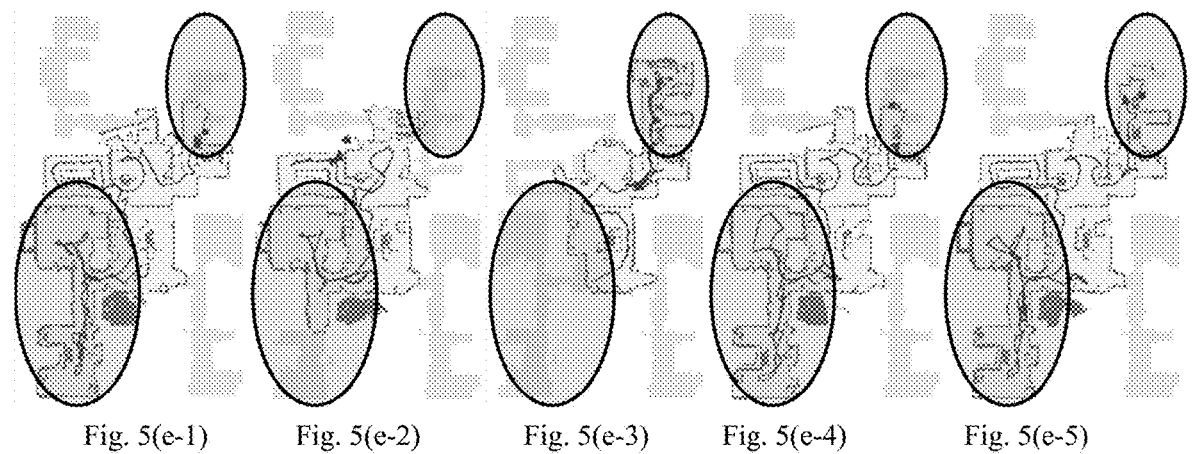
Fig. 5(e-1)  Fig. 5(e-2)  Fig. 5(e-3)  Fig. 5(e-4)  Fig. 5(e-5)

ACTIVE SCENE MAPPING METHOD BASED ON CONSTRAINT GUIDANCE AND SPACE OPTIMIZATION STRATEGIES

TECHNICAL FIELD

The present invention relates to the field of robot perception and computer vision, in particular to an active scene mapping method based on constraint guidance and space optimization strategies.

BACKGROUND

It is essential for many applications in the field of computer vision and robots to scan complex and unknown indoor scenes and construct a complete map. If manually operated, the scanning process is time-consuming and inconvenient, and the mapping results depend heavily on the experience of the scanner, which is not friendly to novice users. Therefore, how to design an exploration strategy that can guide the robot to independently complete the exploration scanning of the whole scene and maximize the scanning of the scene regions with the shortest exploration path has become a crucial research problem which is often called active mapping. Methods related to active mapping can be roughly divided into three categories:

(a) Traditional Heuristic Method

The pioneering work for active mapping introduces the concept of frontier in the traditional heuristic method in "Yamauchi B. A frontier-based approach for autonomous exploration[C]//Proceedings 1997 IEEE International Symposium on Computational Intelligence in Robotics and Automation CIRA'97. 'Towards New Computational Principles for Robotics and Automation'. IEEE, 1997: 146-151.". Grid maps are defined as three types: free, unknown and occupy. By moving the robot to the nearest frontier point in the occupancy map, the robot is driven to explore and scan the whole scene until no frontier point exists in the map, that is, the whole scene is considered to be completely scanned and the exploration ends. Such methods work well for scene exploration. However, the selection of frontier points is usually based on the greedy strategy, so it is difficult to obtain an approximate global optimal solution.

(b) Learning-Based Method

Unlike the traditional heuristic method which uses the myopic strategies to select goals from a set of frontier points, the learning-based method in "Chaplot D S, Gandhi D, Gupta S, et al. Learning to explore using active neural slam[J]. arXiv preprint arXiv:2004.05155, 2020" and "Ye K, Dong S, Fan Q, et al. Multi-robot active mapping via neural bipartite graph matching[C]//Proceedings of the IEEE/CVF Conference on Computer Vision and Pattern Recognition. 2022: 14839-14848" directly uses a convolutional neural network (CNN) or a graph neural network (GNN) to regress the goal position by maximizing the long-term value via reinforcement learning, which allows the exploration strategy to approach global optimization and reduces the computing time of the decision-making process. However, such work usually only uses raw data as the state input of reinforcement learning without further data processing to improve the exploration efficiency.

(c) Information-Theoretic Method

In the information-theoretic method in "Whaite P, Ferrie F P. Autonomous exploration: Driven by uncertainty[J]. IEEE Transactions on Pattern Analysis and Machine Intelligence, 1997, 19(3): 193-205." and "Elfes A. Robot navigation: Integrating perception, environmental constraints and task execution within a probabilistic framework[C]//Reasoning with Uncertainty in Robotics: International Workshop, RUR'95 Amsterdam. The Netherlands Dec. 4-6, 1995 Proceedings. Berlin, Heidelberg: Springer Berlin Heidelberg, 2005: 91-130", another method in the field of active mapping is to use the information theory to guide the robot to select an action that can maximize information gain or reduce scene uncertainty by calculating the information gain or uncertainty values of actions, so as to complete the independent exploration of the scene. However, the action selection of the exploration strategy in the information-theoretic method is still essentially based on the greedy strategy, and the calculation method for information gain or uncertainty values will also have a serious effect on the exploration efficiency.

Most of the above methods rely on the greedy strategy, or the state input form is simple, so the efficiency is limited. In contrast, the method of the present invention optimizes the global optimal exploration problem by means of hybrid-stage optimization instead of maximizing the immediate reward, so as to seek an optimal exploration path globally.

SUMMARY

Aiming at the problem that the existing active mapping of robots has low exploration efficiency and is prone to local optimization, the present invention proposes an active scene mapping method based on constraint guidance and space optimization strategies. By calculating the information entropy of each action in the action space and using the action mask based on reinforcement learning to constrain and guide the exploration strategy of the robot, the entropy space is aligned with the geodesic distance space of the real world so that the exploration process of the robot is not to maximize the immediate reward, so as to seek an optimal exploration path globally.

The present invention has the following technical solution: an active scene mapping method based on constraint guidance and space optimization strategies, comprising a global planning stage and a local planning stage; in the global planning stage, the next exploration goal of a robot is calculated to guide the robot to explore a scene; and after the next exploration goal is determined, specific actions are generated according to the next exploration goal, the position of the robot and the constructed occupancy map in the local planning stage to drive the robot to go to the next exploration goal, and observation data is collected to update the information of the occupancy map, specifically comprising the following steps:

Step 1: generating a state according to the scanning data of the robot;

The state comprises three parts: an occupancy map $M_t$, a geodesic distance map $D(M_t, \omega_t)$ and a frontier-based entropy $I(M_t)$; and $\omega_t$ indicates the position of the robot;

$$s(\omega_t) = (M_t, D(M_t, \omega_t), I(M_t))$$

1.1) Occupancy Map;

A 3D scene model is obtained by back projection of the depth with the pose of the robot according to the observation $C(\omega_t)$ of the robot in position $\omega_t$; a 2D global map is constructed from the top-down view of the 3D scene model as an occupancy map $M_t$; at time t, the occupancy map is expressed as $M_t \in [0,1]^{X \times Y \times 2}$, and X, Y represent the length of the occupancy map and the width of the occupancy map, respectively; the occupancy map comprises two channels indicating the explored and occupied regions, respectively; the grids in the occupancy map $M_t$ are classified as follows:

free (explored but not occupied), occupy (occupied) and unknown (not explored); and the frontier grid $F_t \subset M_t$ is a free grid adjacent to an unknown grid;

1.2) Geodesic Distance Map;

Given the current position cot and the currently constructed occupancy map $M_t$, a geodesic distance map $D(M_t, \omega_t) \in \mathbb{R}^{X \times Y}$ is constructed, wherein $D_{x,y}(M_t, \omega_t)$ represents the geodesic distance from the position (x, y) to the position cot of the robot:

$$D_{x,y}(M_t,\omega_t)=\text{dist}^{M_t}((x,y),\omega_t)$$

The geodesic distance $\text{dist}^{M_t}$ is the shortest distance for traversal between two points in the occupancy map $M_t$, and compared with the Euclidean distance, the geodesic distance can implicitly encode the underlying scene layout information, which has a better guiding role for the robot to explore the scene. The present invention uses the fast marching method to calculate the geodesic distance $\text{dist}^{M_t}$;

1.3) Frontier-Based Entropy;

In addition to raw data $M_t$ and $D(M_t, \omega_t)$, the present invention is also expected to introduce high-level information as constraints, so the frontier-based entropy is introduced as constraints to reduce the searching space when the height of the occupancy map $M_t$ is incomplete; and the frontier point $f \in F_t$ represents a next potential optimal exploration goal, it is found through observation that the frontier points in the scene usually do not exist alone and have the characteristics of small-range aggregation and large-range dispersion, a frontier-based entropy I is introduced for encoding the spatial distribution information of the frontier points, the encoded spatial distribution information is used as one of the inputs of the actor network in the global planning strategy Π to constrain action search, and the frontier-based entropy I is defined as follows:

$$I_{x,y}(M_t) = \left\| \{ f \in F_t \mid \text{dist}^{M_t}(f, (x, y)) < \gamma \} \right\|$$

wherein $I_{x,y}(M_t)$ represents the number of frontier points within the $\gamma \times \gamma$ neighborhood centered on the position (x,y) of the frontier point in the occupancy map $M_t$; and the spatial distribution information contained in each frontier point includes the (x,y) coordinate of the position of the point and the statistical information of the spatial distribution of the frontier points within the neighborhood;

It should be noted that if a frontier point is surrounded by more frontier points, the frontier point will be given a larger information entropy, and for scattered frontier points or noise points, a smaller information entropy can also reduce the impact on global optimization.

Step 2: calculating the probability distribution of the action space of the robot according to the state input;

Off-policy learning approach proximal policy optimization (PPO) is used as a policy optimizer for training optimization and decision execution of the global planning strategy; and the policy optimizer comprises an actor network and a critic network;

The actor network is trained to learn a strategy network and outputs the probability that each action is selected, which uses a multi-layer perceptron (MLP) as an encoder for feature extraction and uses a graph neural network for feature fusion; and a graph is constructed according to the frontier point given by the state $s(\omega_t)$, and feature extraction and feature fusion are carried out on the constructed graph to obtain the score of the frontier point;

The critic network comprises five convolutional layers, a flatten operation and three linear layers, a ReLu activation function is attached behind each convolutional layer and each linear layer, and the flatten operation is used for flattening multi-dimensional data into one-dimensional data; and the critic network is used for predicting the state value $V(s(\omega_t))$ of the occupancy map to indicate the critic value obtained by the current state of the frontier point, and the critic value, as part of the loss function, is used for back propagation during training and for training the actor network;

The process of calculating the probability distribution of the action space according to the state input is specifically as follow:

A graph $G(F_t,\Omega_t)$ is constructed based on the frontier grid $F_t$ and the exploration path $\Omega_t = \{\omega_0, \ldots, \omega_t\}$ to represent the context information of the current scene, a corresponding relation between the robot and the frontier point extracted from the occupancy map $M_t$ is established in the graph $G(F_t,\Omega_t)$, and the information given by the state $s(\omega_t)$ is assigned to the node and edge of $G(F_t,\Omega_t)$; for each node ng, the node input feature feat(n)$\in \mathbb{R}^5$ includes: (x,y) coordinate information in the occupancy map $M_t$, semantic label information indicating $n_i \in F_t$ or $n_i \in \Omega_t$, historical label information indicating that $n_i$ is the current node $\omega_t$ or historical exploration node $n_i \in \{\omega_0, \ldots, \omega_{t-1}\}$, and a frontier-based entropy $I_{n_i}(M_t)$; the node edge feature feat($l_{ij}$)$\in \mathbb{R}^{32}$ is extracted by the multi-layer perceptron (MLP), wherein $l_{ij} \in \mathbb{R}^1$ represents the geodesic distance from node $n_j$ to node $n_i$; the node input feature and the node edge feature are input into the actor network for feature extraction and feature fusion, and a set of scores of frontier points are output; and the sampling probability $\Pi_{mask}(f|s(\omega_t))$ of each action of the robot is calculated based on the set of scores of frontier points;

Step 3: carrying out action mask guided space alignment and selecting the next exploration goal;

The robot selects the frontier point with the highest score a according to $$\omega_{t+1} = \operatorname*{argmax}_{f \in F_t} \prod (f \mid s(\omega_t))$$

as the next exploration goal $\omega_{t+1}$, wherein Π represents the global planning strategy to calculate the score of each frontier point in the current state; and the action space A is to select a frontier point f from the frontier grid $F_t$;

Misalignment of the space metrics of the real-world space and $\Pi(a|s(\omega_t))$ will cause the robot to get stuck or turn back and forth in particular cases. Therefore, based on the score of the frontier point, the action mask strategy is introduced to solve the misalignment problem of the space metrics, and the metrics of the critic value space and the real-world space are aligned; and the action mask strategy includes two action masks: a valid distance mask and a stuck mask, which are used for filtering actions in the action space of the global planning strategy Π and constraining action sampling to a valid action space;

3.1) Valid Distance Mask;

When the robot is exploring in a wide range of complex scenes, it is reasonable and efficient to explore the scenes gradually instead of wandering back and forth among multiple goals. Therefore, ideally, actions given by $\Pi(a|s(\omega_t))$ shall be distributed within a reasonable range around $\omega_t$ to ensure gradual exploration, and such heuristic property also implicitly requires that the metric of $M_t$ and $\Pi(a|s(\omega_t))$ be aligned. To achieve the purpose, a valid distance mask is designed to filter invalid goals in the action space of the global planning strategy; the action space is filtered according to the geodesic distance from the position $\omega_t$ of the robot to the next optimal exploration goal; the nearest threshold $\beta_{near}$ and the farthest threshold $\beta_{far}$ are set; and for a next potential optimal exploration goal beyond the threshold range $[\beta_{near}, \beta_{far}]$, the sampling probability is set to 0, and $\Pi_{mask}(f|s(\omega_t))$ after the valid distance mask is as follows:

$$\Pi_{mask}(f|s(\omega_t)) = \begin{cases} 0, & \text{if } dist^{M_t}(f, \omega_t) \in [\beta_{near}, \beta_{far}] \\ \Pi(f|s(\omega_t)), & \text{otherwise} \end{cases}$$

wherein $\Pi_{mask}(f|s(\omega_t))$ represents the action mask probability of selecting the frontier point f as the next exploration goal, $dist^{M_t}(f, \omega_t)$ is the geodesic distance from the position $\omega_t$ of the robot to the frontier point f, and $\Pi(f|s(\omega_t))$ is original probability distribution from the encoder of the actor network;

3.2) Stuck Mask

The stuck mask is used for filtering out actions in the action space that cause the robot to get stuck; the max moving length $$l_{max} = \max_{i \in \{t-1, t-2\}} dist^{M_t}(\omega_i, \omega_{i+1})$$

and the max area increment $$c_{max} = \max_{i \in \{t-1, t-2\}} \|c(M_i) - c(M_{i+1})\|$$

of the robot in the last three global planning stages are calculated, wherein $c(M_t)$ represents the area of the scanned region at time t calculated according to the occupancy map $M_t$, and when the moving length $l_{max}$ and the area increment $c_{max}$ are greater than the set thresholds, the action is considered reasonable; otherwise, the probability value corresponding to the action is set to 0, that is $\Pi_{mask}(a|s(\omega_t))=0$;

Step 4: planning a path to the next exploration goal;

The robot uses the fast marching method (FMM) to plan a moving path according to the position $\omega_t$ of the robot, the next exploration goal $\omega_{t+1}$ obtained by calculation and the constructed occupancy map $M_t$ to drive the robot to go to the next exploration goal, and observation data scanned by the robot during movement is collected to update the information of the map.

Step 5: making a judgment about the termination of exploration;

Repeating steps 1-4 to judge whether the exploration meets the termination conditions, and terminating the exploration when the scanning coverage of the robot exceeds the set threshold or the number of exploration steps of the robot exceeds the maximum set number of steps.

In the present invention, the entropy of each frontier point is calculated firstly and used as additional information of the state input to guide the exploration strategy of the robot to imitate the local greedy strategy. However, entropy-based optimization is prone to local optimization because the entropy space and the real world do not share the same metric. Inspired by constrained reinforcement learning, the present invention introduces constraint optimization based on action masks to align the metrics of the two spaces, and the exploration optimization in the aligned spaces can more effectively avoid long-distance round trips and improve the scene exploration efficiency.

The specific implementation result is that the robot constructs a graph according to the collected local scene information, independently decides the position of the next goal through deep reinforcement learning, drives the robot to scan the scene, and iterates the process to complete the active mapping of the indoor scene and obtain a complete scene map, which involves the methods of robot mapping and independent decision-making.

Steps 1-3 belong to the global planning stage, which determines the next exploration goal, that is the long-term goal, for the robot through the policy network. Step 4 belongs to the local planning stage.

The present invention has the following beneficial effects: the present invention introduces a frontier-based entropy to constrain network inputs, the method combines the traditional heuristic method with reinforcement learning methods and proposes action mask constraints to guide the network to carry out valid global planning by adjusting the metrics of the critic value space and the real-world space, and such design is proved to effectively avoid long-distance round trips in the exploration process so that the robot can take account of information gain and movement loss in the exploration process, find a balance of the exploration efficiency, and realize the improvement of the active mapping efficiency.

DESCRIPTION OF DRAWINGS

FIG. 3 shows calculation of a frontier-based entropy of the present invention.

FIG. 4(a-1)-FIG. 4(a-5) show comparison of training results of different methods in scene 1; FIG. 4(a-1) shows Greedy Dist, and FIG. 4 (a-2) shows Greedy Info; FIG. 4(a-3) shows Active Neural SLAM; FIG. 4(a-4) shows NeuralCoMapping; and FIG. 4(a-5) shows a method of the present invention;

FIG. 4(b-1)-FIG. 4(b-5) show comparison of training results of different methods in scene 2; FIG. 4(b-1) shows Greedy Dist, and FIG. 4 (b-2) shows Greedy Info; FIG. 4(b-3) shows Active Neural SLAM; FIG. 4(b-4) shows NeuralCoMapping; and FIG. 4(b-5) shows a method of the present invention;

FIG. 4(c-1)-FIG. 4(c-5) show comparison of training results of different methods in scene 3; FIG. 4(c-1) shows Greedy Dist, and FIG. 4(c-2) shows Greedy Info; FIG. 4(c-3) shows Active Neural SLAM; FIG. 4(c-4) shows NeuralCoMapping; and FIG. 4(c-5) shows a method of the present invention;

FIG. 4(d-1)-FIG. 4(d-5) show comparison of training results of different methods in scene 4; FIG. 4(b-1) shows Greedy Dist, and FIG. 4 (b-2) shows Greedy Info; FIG. 4(b-3) shows Active Neural SLAM; FIG. 4(b-4) shows NeuralCoMapping; and FIG. 4(b-5) shows a method of the present invention;

FIG. 4(e-1)-FIG. 4(e-5) show comparison of training results of different methods in scene 5; FIG. 4(e-1) shows Greedy Dist, and FIG. 4(e-2) shows Greedy Info; FIG.

4(e-3) shows Active Neural SLAM; FIG. 4(e-4) shows NeuralCoMapping; and FIG. 4(e-5) shows a method of the present invention;

FIG. 5(a-1)-FIG. 5(a-5) show comparison of training results of different methods in scene 6; FIG. 5(a-1) shows Greedy Dist, and FIG. 5 (a-2) shows Greedy Info; FIG. 5(a-3) shows Active Neural SLAM; FIG. 5(a-4) shows NeuralCoMapping; and FIG. 5(a-5) shows a method of the present invention;

FIG. 5(b-1)-FIG. 5(b-5) show comparison of training results of different methods in scene 7; FIG. 5(b-1) shows Greedy Dist, and FIG. 5(b-2) shows Greedy Info; FIG. 5(b-3) shows Active Neural SLAM; FIG. 5(b-4) shows NeuralCoMapping; and FIG. 5(b-5) shows a method of the present invention;

FIG. 5(c-1)-FIG. 5(c-5) show comparison of training results of different methods in scene 8; FIG. 5(c-1) shows Greedy Dist, and FIG. 5(c-2) shows Greedy Info; FIG. 5(c-3) shows Active Neural SLAM; FIG. 5(c-4) shows NeuralCoMapping; and FIG. 5(c-5) shows a method of the present invention;

FIG. 5(d-1)-FIG. 5(d-5) show comparison of training results of different methods in scene 9; FIG. 5(b-1) shows Greedy Dist, and FIG. 5(b-2) shows Greedy Info; FIG. 5(b-3) shows Active Neural SLAM; FIG. 5(b-4) shows NeuralCoMapping; and FIG. 5(b-5) shows a method of the present invention;

FIG. 5(e-1)-FIG. 5(e-5) show comparison of training results of different methods in scene 10; FIG. 5(e-1) shows Greedy Dist, and FIG. 5(e-2) shows Greedy Info; FIG. 5(e-3) shows Active Neural SLAM; FIG. 5(e-4) shows NeuralCoMapping; and FIG. 5(e-5) shows a method of the present invention.

DETAILED DESCRIPTION

Specific embodiments of the present invention are further described below in combination with accompanying drawings and the technical solution.

The present embodiment is run based on the IGibson simulator, 50 scenes are selected from the IGibson data set for training, and 13 scenes are selected from the IGibson and Matterport data sets for testing. Most of the training scenes and testing scenes are large-scale scenes (with the area greater than or equal to 30 m$^2$), and also comprise large-scale scenes and small-scale scenes. The maximum number of scene exploration steps is set to n=3000, and the scene coverage of exploration termination is set to r=90%. The exploration will be terminated only when the number of exploration steps exceeds n or the area of the explored region is larger than r.

Figure 1:
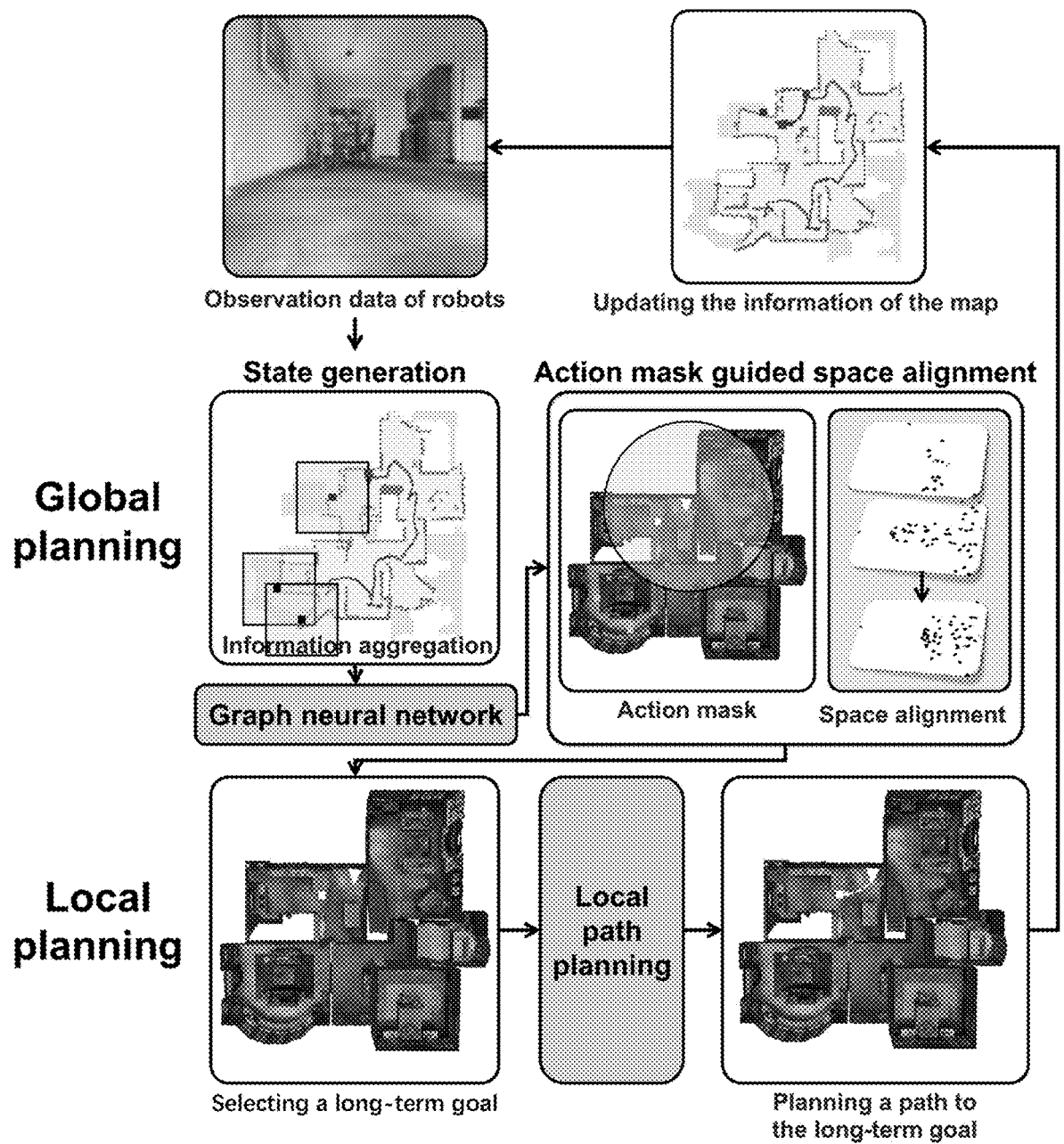
FIG. 1 is an overall flow chart of an active scene mapping method based on constraint guidance and space optimization strategies of the present invention.

FIG. 1 is an overall flow chart of the present invention, mainly including two planning stages: global planning stage and local planning stage. In the global planning stage, the next exploration goal, i.e., the long-term goal, of a robot shall be calculated to guide the robot to explore a scene; and after the long-term goal is determined, a set of specific actions are generated according to the long-term goal, the position of the robot and the constructed exploration map in the local planning stage to drive the robot to go to the long-term goal, and observation data is collected to update the information of the map. In the specific practices of the present invention, the interval of moving steps in the global planning stage is set to 25 steps, i.e., the robot updates the long-term goal every 25 steps. The global planning stage and the local planning stage are alternate until the whole scene is explored completely or the number of exploration steps of the robot exceeds the maximum set number of steps.

Figure 2:
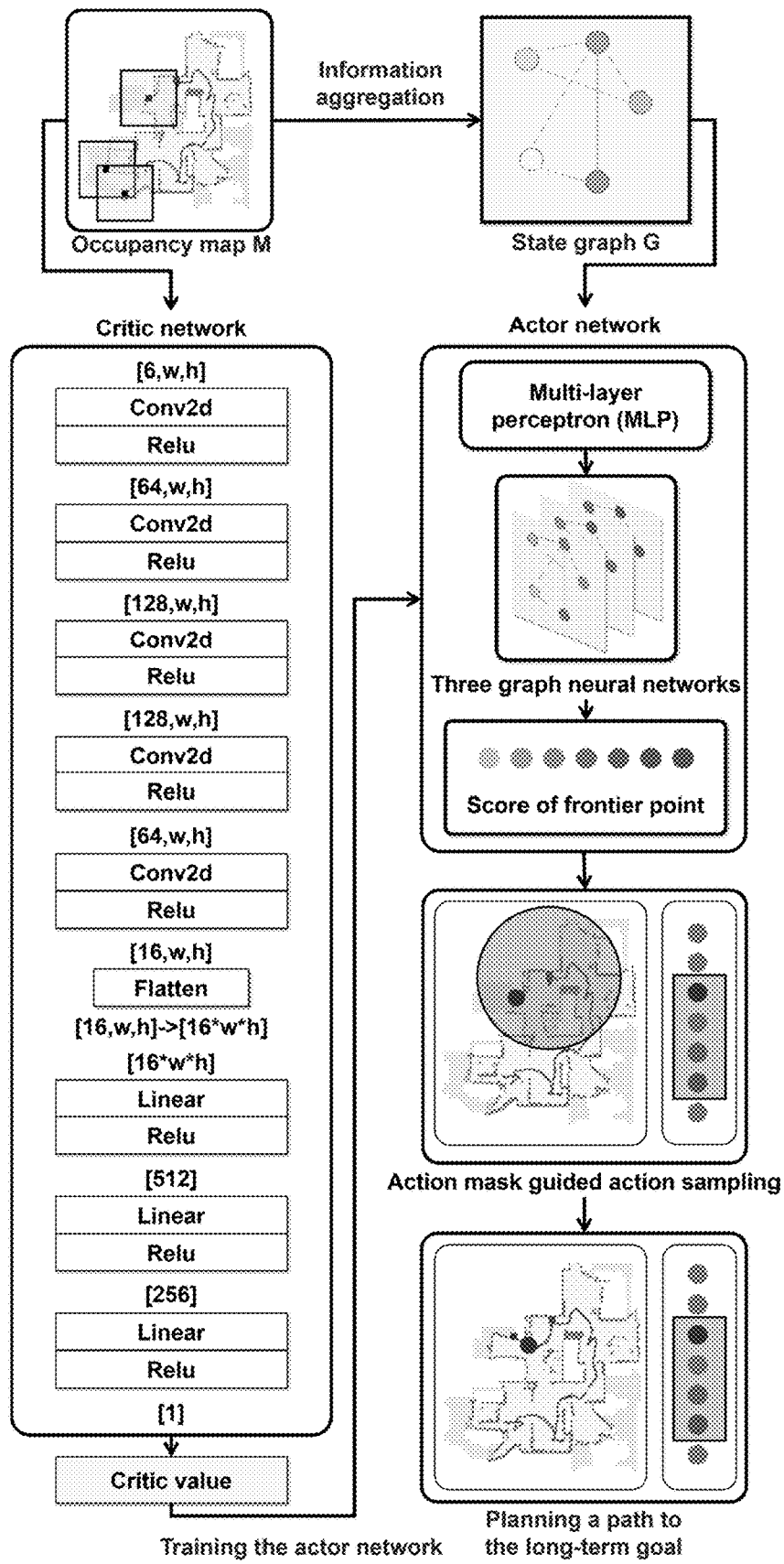
FIG. 2 shows a network architecture of a global planning stage of the present invention.

FIG. 2 shows a network architecture of a global planning stage of the present invention. The robot extracts frontier points according to the constructed occupancy map M, calculates the information entropy of each frontier point, constructs a state graph G, sends the state graph as the state input to the actor network, and outputs the score of each frontier point through the encoder and three graph neural networks. Then, according to the score, action mask guided action sampling is carried out to determine the long-term goal. The critic network calculates a critic value according to the occupancy map M to train the actor network.

FIG. 3 shows the calculation process of a frontier-based entropy, and according to each frontier point, the robot calculates the sum of all frontier points in a neighborhood map centered on the point and assigns the point as the entropy of the frontier point.

FIG. 4 and FIG. 5 show visualization results of a contrast experiment. Greedy Dist and Greedy Info are distance-based greedy strategy and information gain-based greedy strategy, respectively, i.e., a point closer to the robot and a point with greater information gain is selected to drive the robot to explore the scene; Active Neural SLAM (ANS) takes the whole map as the input and trains a convolutional neural network to learn the strategies, and the output is any point in the map, which is used as the long-term goal to drive the robot to explore the scene; and NeuralCoMapping extracts the frontier points in the map, uses the original information of the frontier points such as x, y coordinate to construct a graph, and takes the graph as the input to train a graph neural network to learn the strategies, and the output long-term goal is a frontier point in the graph. All the methods are tested in the same scene, and the final visualization result shows the mapping results and the moving path of the robot. It can be found through the contrast experiment that the exploration strategy used in the present invention has better performance in terms of exploration completeness and exploring path rationality as well as the degree of the robot getting stuck, and verifies the effectiveness of the method of the present invention for active mapping tasks.

The quantitative verification results of the contrast experiment are shown in Table 1. The exploration area represents the total area of the regions scanned by the robot, and the coverage ratio is the ratio of the exploration area to the area of the whole scene, which is used for measuring the exploration completeness of the robot. The larger the value of completeness is, the more complete the scene scanning is. The exploration efficiency is the ratio of the exploration area to the number of exploration steps, which represents the average information gain of each exploration step of the robot and is used for measuring the exploration efficiency of the robot. The larger the value is, the higher the exploration efficiency of the robot is, and the more reasonable the exploration path planning of the robot is, without large-scale reentry and invalid actions.

TABLE 1

| Method | Exploration Area (m$^2$) | Coverage (%) | Exploration Efficiency (m$^2$/step) |
|---|---|---|---|
| Greedy Dist | 49.79 | 72.57 | 0.02008 |
| Greedy Info | 55.17 | 79.82 | 0.03683 |
| ANS | 50.97 | 79.35 | 0.02052 |
| NeuralCoMapping | 63.34 | 90.37 | 0.04011 |
| The present invention | 67.14 | 92.49 | 0.04189 |

The invention claimed is:

1. An active scene mapping method based on constraint guidance and space optimization strategies, comprising a global planning stage and a local planning stage; in the global planning stage, the next exploration goal of a robot is calculated to guide the robot to explore a scene; and when the next exploration goal is determined, specific actions are generated according to the next exploration goal, the position of the robot and the constructed occupancy map in the local planning stage to drive the robot to go to the next exploration goal, and observation data is collected to update the information of the occupancy map, specifically comprising the following steps:

step 1: generating a state according to the scanning data of the robot;

the state comprises three parts: an occupancy map $M_t$, a geodesic distance map $D(M_t, \omega_t)$ and a frontier-based entropy $I(M_t)$; and $\omega_t$ indicates the position of the robot;

$$s(\omega_t)=(M_t, D(M_t,\omega_t), I(M_t))$$

1.1) Occupancy Map;

a 3D scene model is obtained by back projection of the depth with the pose of the robot according to the observation $C(\omega_t)$ of the robot in position $\omega_t$; a 2D global map is constructed from the top-down view of the 3D scene model as an occupancy map $M_t$; at time t, the occupancy map is expressed as $M_t \in [0,1]^{X \times Y \times 2}$, and X, Y represent the length of the occupancy map and the width of the occupancy map, respectively; the occupancy map comprises two channels indicating the explored and occupied regions, respectively; the grids in the occupancy map $M_t$ are classified as follows: free (explored but not occupied), occupy (occupied) and unknown (not explored); and the frontier grid $F_t \subset M_t$ is a free grid adjacent to an unknown grid;

1.2) geodesic distance map;

given the current position $\omega_t$ and the currently constructed occupancy map $M_t$, a geodesic distance map $D(M_t, \omega_t) \in \mathbb{R}^{X \times Y}$ is constructed, wherein $D_{x,y}(M_t, \omega_t)$ represents the geodesic distance from the position (x, y) to the position $\omega_t$ of the robot:

$$D_{x,y}(M_t,\omega_t)=\text{dist}^{M_t}((x,y),\omega_t)$$

the geodesic distance $\text{dist}^{M_t}$ is the shortest distance for traversal between two points in the occupancy map $M_t$, and the geodesic distance $\text{dist}^{M_t}$ is calculated by the fast marching method;

1.3) frontier-based entropy;

the frontier-based entropy is introduced as constraints to reduce the searching space when the height of the occupancy map $M_t$ is incomplete; and the frontier point $f \in F_t$ represents a next potential optimal exploration goal, a frontier-based entropy I is introduced for encoding the spatial distribution information of the frontier points based on the characteristics of small-range aggregation and large-range dispersion of frontier points, the encoded spatial distribution information is used as one of the inputs of the actor network in the global planning strategy $\Pi$ to constrain action search, and the frontier-based entropy I is defined as follows:

$$I_{x,y}(M_t) = \|\{f \in F_t \mid \text{dist}^{M_t}(f, (x, y)) < \gamma\}\|$$

wherein $I_{x,y}(M_t)$ represents the number of frontier points within the $\gamma \times \gamma$ neighborhood centered on the position (x,y) of the frontier point in the occupancy map $M_t$; and the spatial distribution information contained in each frontier point includes the (x,y) coordinate of the position of the point and the statistical information of the spatial distribution of the frontier points within the neighborhood;

step 2: calculating the probability distribution of the action space of the robot according to the state input;

off-policy learning approach proximal policy optimization (PPO) is used as a policy optimizer for training optimization and decision execution of the global planning strategy; and the policy optimizer comprises an actor network and a critic network;

the actor network uses a multi-layer perceptron (MLP) as an encoder for feature extraction and uses a graph neural network for feature fusion; and a graph is constructed according to the frontier point given by the state $s(\omega_t)$, and feature extraction and feature fusion are carried out on the constructed graph to obtain the score of the frontier point;

the critic network comprises five convolutional layers, a flatten operation and three linear layers, a ReLu activation function is attached behind each convolutional layer and each linear layer, and the flatten operation is used for flattening multi-dimensional data into one-dimensional data; and the critic network is used for predicting the state value $V(s(\omega_t))$ of the occupancy map to indicate the critic value obtained by the current state of the frontier point, and the critic value, as part of the loss function, is used for training the actor network;

the process of calculating the probability distribution of the action space according to the state input is specifically as follow:

a graph $G(F_t, \Omega_t)$ is constructed based on the frontier grid $F_t$ and the exploration path $\Omega_t = \{\omega_0, \ldots, \omega_t\}$ to represent the context information of the current scene, a corresponding relation between the robot and the frontier point extracted from the occupancy map $M_t$ is established in the graph $G(F_t, \Omega_t)$, and the information given by the state $s(\omega_t)$ is assigned to the node and edge of $G(F_t, \Omega_t)$; for each node $n_i$, the node input feature $\text{feat}(n_i) \in \mathbb{R}^5$ includes: (x,y) coordinate information in the occupancy map $M_t$, semantic label information indicating $n_i \in F_t$ or $n_i \in \Omega_t$, historical label information indicating that $n_i$ is the current node at or historical exploration node $n_i \in \{\omega_0, \ldots, \omega_{t-1}\}$, and a frontier-based entropy $I_{n_i}(M_t)$; the node edge feature $\text{feat}(l_{ij}) \in \mathbb{R}^{32}$ is extracted by the multi-layer perceptron (MLP), wherein $l_{ij} \in \mathbb{R}^1$ represents the geodesic distance from node $n_j$ to node $n_i$; the node input feature and the node edge feature are input into the actor network for feature extraction and feature fusion, and a set of scores of frontier points are output; and the sampling probability $\Pi_{mask}(f | s(\omega_t))$ of each action of the robot is calculated based on the set of scores of frontier points;

step 3: carrying out action mask guided space alignment and selecting the next exploration goal;

the robot selects the frontier point with the highest score according to $$\omega_{t+1} = \underset{f \in F_t}{\arg\max} \prod (f \mid s(\omega_t))$$

as the next exploration goal $\omega_{t+1}$, wherein H represents the global planning strategy to calculate the score of each frontier point in the current state; and the next exploration goal $\omega_{t+1}$ is to select a frontier point f from the frontier grid $F_t$;

based on the score of the frontier point, the action mask strategy is introduced to solve the misalignment problem of the space metrics; and the action mask strategy includes two action masks: a valid distance mask and a stuck mask, which are used for filtering actions in the action space of the global planning strategy $\Pi$ and constraining action sampling to a valid action space;

3.1) valid distance mask;

the valid distance mask is used for filtering invalid goals in the action space of the global planning strategy; the action space is filtered according to the geodesic distance from the position $\omega_t$ of the robot to the next optimal exploration goal; the nearest threshold $\beta_{near}$ and the farthest threshold $\beta_{far}$ are set; and for a next potential optimal exploration goal beyond the threshold range $[\beta_{near}, \beta_{far}]$, the sampling probability is set to 0, and $\Pi_{mask}(f|s(\omega_t))$ after the valid distance mask is as follows:

$$\Pi_{mask}(f|s(\omega_t)) = \begin{cases} 0, & \text{if } dist^{M_t}(f, \omega_t) \in [\beta_{near}, \beta_{far}] \\ \Pi(f|s(\omega_t)), & \text{otherwise} \end{cases}$$

wherein $\Pi_{mask}(f|s(\omega_t))$ represents the action mask probability of selecting the frontier point f as the next exploration goal, $dist^{M_t}(f, \omega_t)$ is the geodesic distance from the position $\omega_t$ of the robot to the frontier point f, and $\Pi(f|s(\omega_t))$ is original probability distribution from the encoder of the actor network;

3.2) stuck mask the stuck mask is used for filtering out actions in the action space that cause the robot to get stuck; the max moving length $$l_{max} = \max_{i \in \{t-1, t-2\}} dist^{M_t}(\omega_i, \omega_{i+1})$$

and the max area increment $$c_{max} = \max_{i \in \{t-1, t-2\}} \|c(M_i) - c(M_{i+1})\|$$

of the robot in the last three global planning stages are calculated, wherein $c(M_t)$ represents the area of the scanned region at time t calculated according to the occupancy map $M_t$, and when the moving length $l_{max}$ and the area increment $c_{max}$ are greater than the set thresholds, the action is considered reasonable; otherwise, the probability value corresponding to the action is set to 0, that is $\Pi_{mask}(a|s(\omega_t))=0$;

step 4: planning a path to the next exploration goal;

the robot uses the fast marching method (FMM) to plan a moving path according to the position $\omega_t$ of the robot, the next exploration goal $\omega_{t+1}$ obtained by calculation and the constructed occupancy map $M_t$ to drive the robot to go to the next exploration goal, and observation data scanned by the robot during movement is collected to update the information of the map;

step 5: making a judgment about the termination of exploration;

repeating steps 1-4 to judge whether the exploration meets the termination conditions, and terminating the exploration when the scanning coverage of the robot exceeds the set threshold or the number of exploration steps of the robot exceeds the maximum set number of steps.

* * * * *